US012071033B2

(12) United States Patent
Myer et al.

(10) Patent No.: US 12,071,033 B2
(45) Date of Patent: Aug. 27, 2024

(54) INLET CHARGING PLUG DETECTION SENSOR

(71) Applicants: Tyco Electronics Canada ULC, Mississauga (CA); TE Connectivity Services GmbH, Schaffhausen (CH)

(72) Inventors: Nathan Philip Myer, Middletown, PA (US); Christopher Couch, Troy, MI (US); Tomas Mockovciak, Mississauga (CA)

(73) Assignees: TYCO Electronics Canada ULC (CA); TE Connectivity Solutions GmbH (CH)

( * ) Notice: Subject to any disclaimer, the term of this patent is extended or adjusted under 35 U.S.C. 154(b) by 151 days.

(21) Appl. No.: 17/682,767

(22) Filed: Feb. 28, 2022

(65) Prior Publication Data

US 2023/0023420 A1 Jan. 26, 2023

Related U.S. Application Data

(60) Provisional application No. 63/223,573, filed on Jul. 20, 2021.

(51) Int. Cl.
*B60L 53/16* (2019.01)
*H01R 13/627* (2006.01)
*H01R 43/26* (2006.01)

(52) U.S. Cl.
CPC .......... *B60L 53/16* (2019.02); *H01R 13/6272* (2013.01); *H01R 43/26* (2013.01); *H01R 2201/26* (2013.01)

(58) Field of Classification Search
CPC .. H01R 13/641; H01R 2201/26; H01R 43/26; B60L 53/16
USPC .................................................... 439/489, 34
See application file for complete search history.

(56) References Cited

U.S. PATENT DOCUMENTS

| | | | | | |
|---|---|---|---|---|---|
| 5,222,164 | A | * | 6/1993 | Bass, Sr. | H01R 13/6683 439/488 |
| 6,165,005 | A | * | 12/2000 | Mills | A61B 5/14552 439/489 |
| 7,384,300 | B1 | * | 6/2008 | Salgado | H01R 13/7035 439/489 |
| 7,635,280 | B1 | * | 12/2009 | Crumlin | H01R 13/7039 439/489 |
| 8,449,319 | B2 | * | 5/2013 | Fujii | H01R 13/641 439/489 |
| 8,460,025 | B2 | * | 6/2013 | Segawa | H01R 13/641 439/489 |
| 8,573,994 | B2 | * | 11/2013 | Kiko | B60L 3/0069 439/372 |
| 8,643,476 | B2 | * | 2/2014 | Pinn | H04Q 1/136 340/687 |
| 8,747,147 | B2 | * | 6/2014 | Yu | H01R 13/7031 439/108 |
| 8,905,779 | B2 | * | 12/2014 | Little | H01R 13/641 439/489 |
| 8,920,187 | B2 | * | 12/2014 | Kon | H01R 13/641 439/352 |

(Continued)

*Primary Examiner* — Gary F Paumen

(57) ABSTRACT

A charging inlet for an electric vehicle includes a housing, a terminal arranged within the housing for engaging with a corresponding mating terminal of a charging plug, and a sensor connectable to a monitoring system of the electric vehicle for detecting the presence of a charging plug installed within the charging inlet.

19 Claims, 8 Drawing Sheets

(56) References Cited

U.S. PATENT DOCUMENTS

| | | | |
|---|---|---|---|
| 2009/0053923 A1* | 2/2009 | Navarro | H04Q 1/136 |
| | | | 439/489 |
| 2013/0122738 A1* | 5/2013 | Mann | H01R 13/03 |
| | | | 439/490 |
| 2014/0087585 A1* | 3/2014 | Anastas | H01R 13/641 |
| | | | 439/489 |
| 2015/0132975 A1* | 5/2015 | Yossef | H01R 13/6691 |
| | | | 29/874 |
| 2015/0318640 A1* | 11/2015 | Gibeau | H01R 13/641 |
| | | | 439/489 |

\* cited by examiner

INLET CHARGING PLUG DETECTION SENSOR

CROSS-REFERENCE TO RELATED APPLICATIONS

This application claims priority to U.S. Provisional Application No. 63/322,357, filed on Jul. 20, 2021, the entire disclosure of which is incorporated by reference herein.

FIELD OF THE INVENTION

The present disclosure relates to electrical connectors, and more particularly, to electrical connectors having plug status detection capability.

BACKGROUND

Electric vehicles (EVs) are increasing in popularity as their practicality and usability improves. Accordingly, these early systems must be continuously optimized to extract maximum safety, performance, usability and convenience. One critical aspect of EV usability includes the ability to consistently charge the batteries of an EV as quickly as possible over the life of the vehicle. Ensuring safety during charging operations requires secure, reliable connections between a charging inlet or receptacle of the vehicle (by way of example only), and a charging plug associated with the charger. Currently, some charger-side systems are equipped with means for detecting a properly inserted charging plug prior to the commencement of a charging operation. The vehicle, however, is not typically equipped with a means to detect that a charging plug has been properly inserted into (or removed from) its charging inlet. Likewise, no vehicle-side systems exist for detecting mechanical issues or failures with the charging plug and/or the charging inlet. By way of example, a failure in a latching or locking mechanism of the charging plug and/or the charging inlet not only risks negatively affecting the ability to reliable charge a vehicle, but also increases risks of more severe conditions, such as electrical shorts which can lead to component damage and even fire.

SUMMARY

In one embodiment of the present disclosure, a charging inlet for an electric vehicle includes a housing, a terminal arranged within the housing for engaging with a corresponding mating terminal of a charging plug, and a sensor connectable to a monitoring system of the electric vehicle for detecting the presence of a charging plug installed within the charging inlet.

BRIEF DESCRIPTION OF THE DRAWINGS

The invention will now be described by way of example with reference to the accompanying Figures, of which.

DETAILED DESCRIPTION OF THE EMBODIMENTS

Figure 1:
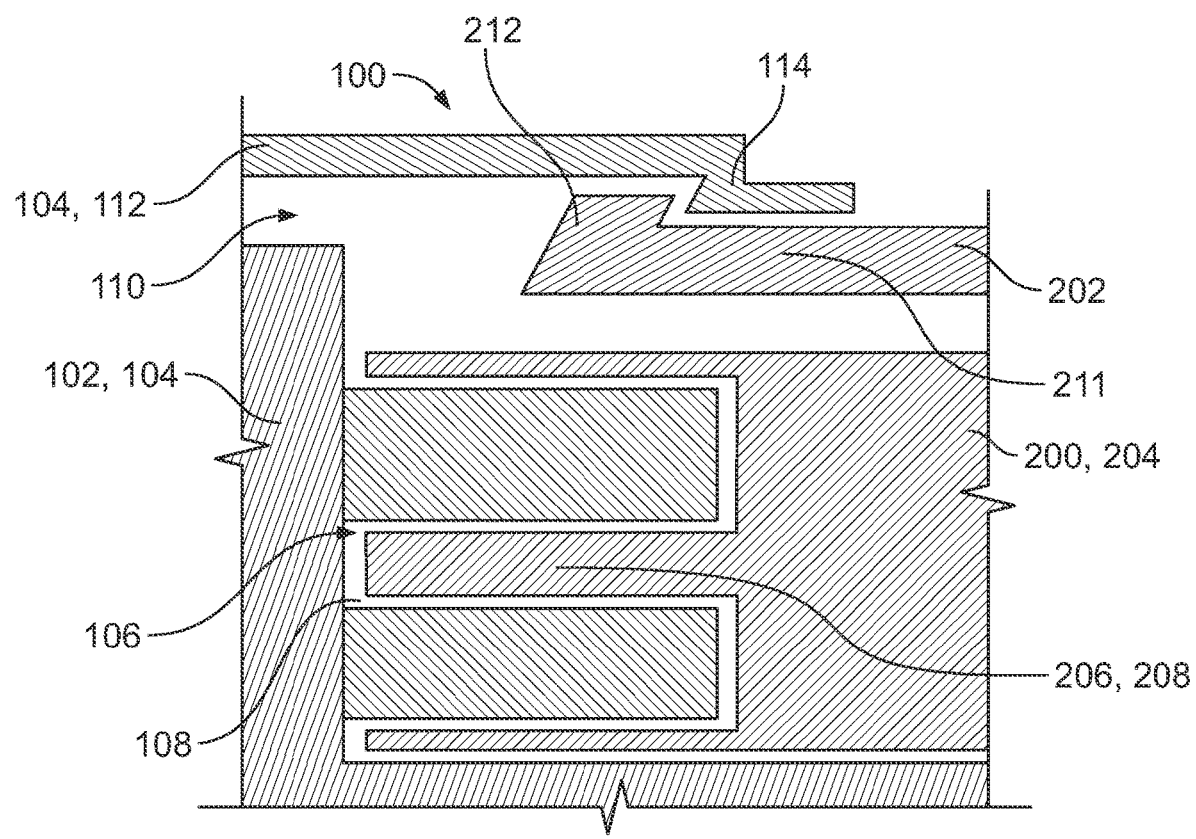
FIG. 1 is partial cross-sectional view of a charging inlet and charging plug useful for describing embodiments of the present disclosure in a locked or latched position.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Referring to FIG. 1, a simplified, partial view of a charging assembly 100 (e.g., for an electric vehicle) useful for describing embodiments of the present disclosure is shown. The assembly 100 includes a vehicle-side charging inlet or socket 102 including a main body or housing 104. The body 104 defines a charging interface including one or more openings 106 housing conductive terminal(s) 108 (e.g., male or female terminals) adapted to mate with corresponding terminal(s) 208 of a charging plug 200 engaged therewith. The body 104 defines a receiving space 110 for accepting all or part of the charging plug 200. The receiving space 110 may be defined in part by an outer or perimeter wall 112 of the body 104. In the exemplary embodiment, the wall 112 defines at least one locking feature, embodied as a step or catch 114 protruding into the receiving space 110. The catch 114 is adapted to engage with a corresponding elastic latch 202 of the charging plug 200, as will be set forth in detail herein. While the locking feature 114 is shown as formed on an interior surface of the wall 112, it should be understood that multiple similar locking features may be formed on, or otherwise attached to, any suitable surface or area associated with the charging inlet 102 without departing from the scope of the present disclosure. Likewise, the corresponding locking feature of the charging plug 200 may be embodied in any suitable manner.

Still referring to FIG. 1, the charging plug 200 is associated with a source of electrical power (not shown), and includes a body or housing 204 (e.g., a monolithic body), with only portions thereof shown in the figure. The body 204 includes and interface portion 206 including the one or more terminals 208 configured to engage with the openings 106 and terminals 108 of the charging inlet 102 with the plug 200 in the installed position shown in FIG. 1. The body 204, or a separate element attached thereto, defines the latch 202 configured to engage with the locking feature or catch 114 of the charging inlet 102 in the installed position.

The latch 202 may be defined as a cantilevered beam elastically deformable in each vertical direction (i.e., upwards and downwards) relative to the orientation shown in FIG. 1. More specifically, the latch 202 includes an elongated body 211 having a protruding end 212 formed thereon and extending or protruding in a direction generally perpendicular to an axis of elongation of the body. The protruding end 212 may define a tapered front end configured to engage with the charging inlet 102 (e.g., the wall 112 thereof), as the plug is inserted therein. As can be visualized from the figure, due to the tapered nature of the front end, the latch 202 will initially be deflected downward by the stepped wall 112 or catch 114 as the plug 200 is inserted into the inlet 102. Once the plug 200 reaches the installed position, the latch 202 will elastically return to the illustrated position, wherein the front end 212 engages with the catch 114 of the inlet 102. As shown, the locking feature or catch 114 includes a surface opposing a corresponding surface of the front end 212. The opposing surfaces may each extend obliquely, and at least partially oppose each other in a removal direction of the plug 200 relative to the inlet 102. Once in the illustrated installed position of FIG. 1, the plug 200 may be removed by manually depressing the latch 202 in a downward direction, disengaging the opposing surfaces, and allowing the plug to be removed.

As described above, in view of the exemplary locking or latching arrangement of FIG. 1, it is desired for a charging system (e.g., a charging control system of a vehicle), to ensure a properly locked or installed plug within its charging inlet. Further, it is advantageous to enable the detection of the plug latch relative to the corresponding inlet locking feature. In this way, a system according to embodiments of the present disclosure may detect the depression of the locking mechanism by a user (e.g., the plug latch 202), even prior to the physical disconnection of the plug from the inlet (or the corresponding terminals thereof from one another). In this way, the vehicle (or like system), may cease charging operations prior to mechanical disconnection, further increasing safety.

Likewise, embodiments of the present disclosure enable the detection of a damaged latching mechanism, alerting both the system and a user of a potential unsafe condition of a plug not secured within the inlet, despite a detected electrical connection. By detecting the position of the charging plug at the latch, several advantages are realized. For example, detection occurs when the latch button is depressed, which occurs prior to the removal of the plug, expediting the detection of any faults. Further, the mechanism is able to detect the presence or a broken or at least non-functioning latch, alerting the vehicle to the condition.

Figure 2:
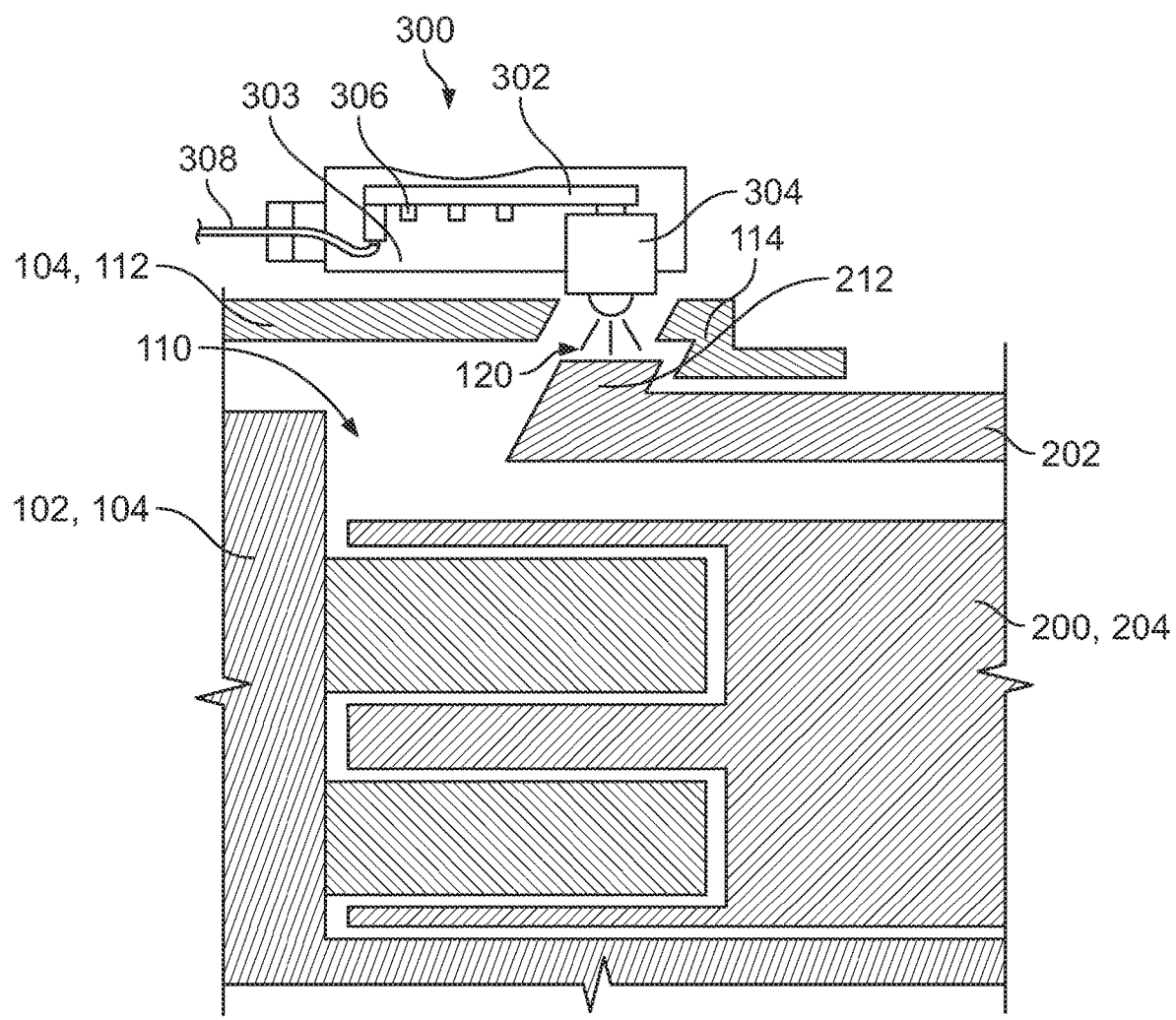
FIG. 2 is partial cross-sectional view of a charging inlet and charging plug having a plug position detection system according to an embodiment of the present disclosure.
Figure 9:
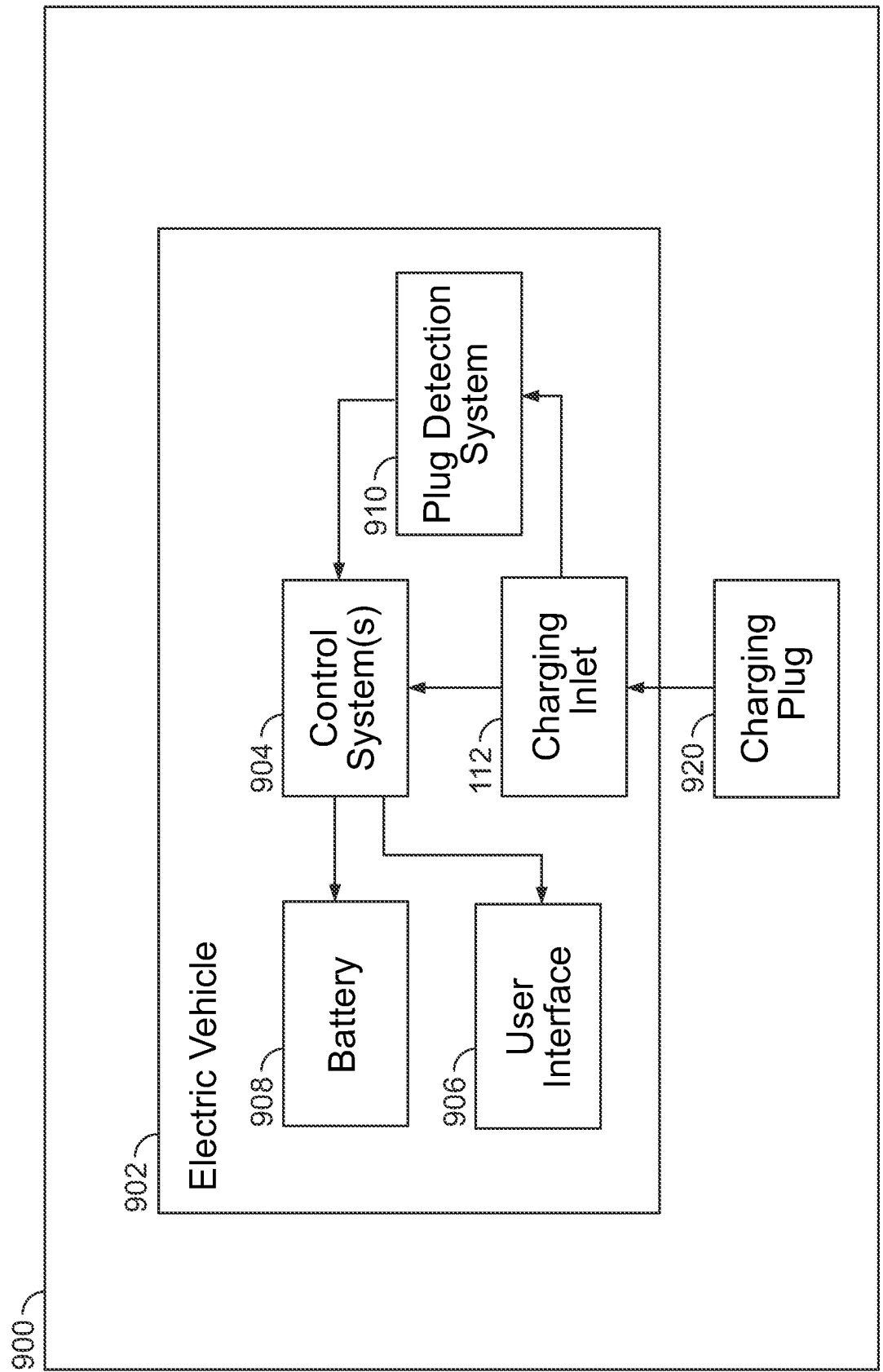
FIG. 9 is a simplified schematic diagram of a charging system according to an embodiment of the present disclosure.

Referring now to FIG. 2, a simplified illustration of an embodiment of the present disclosure includes a vehicle-side sensor package 300 which may be integrated into the charging inlet 102 shown in FIG. 1. The package 300 may include, for example, a printed circuit board (PCB) 302 housed in a frame 303. An optical sensor 304 is mounted on the PCB 302 with a sensing aperture oriented in a generally downward direction. Other control elements, such as one or more control processors 306 may also be included for controlling the operation of the optical sensor 304, as well as controlling any signals transmitted thereto and/or processing signals received therefrom. Signal wires 308 may operatively connect the PCB 302 to an external system (e.g., a plug detection system and/or other control system, as shown in FIG. 9). The sensor package 300 may be fixed to an exterior of the inlet 102 (as shown), or internally therewith. In other embodiments, the package 300 may be located remotely from the inlet without departing from the scope of the present disclosure.

Still referring to FIG. 2, the optical sensor 304, in conjunction with one or more processors (e.g., processor 306), utilizes transmitted and/or received light to detect the presence of the latch 202, and more specifically, the protruding free end 212 thereof in the installed position the inlet 102. As shown, the wall 112 of the inlet 102 defining the locking feature or catch 112 defines an aperture 120 therethrough. The aperture or opening 120 is positioned correspondingly with (e.g., directly above) a final location of the free end 212 of the latch 202 in the installed position. In other embodiments, the opening 120 may be formed in alternate locations which expose at least a portion of the protruding free end 212 of the latch 202 therethrough, such that light from the optical sensor 304 may impinge on the free end and/or be reflected thereby and received by the sensor 304. Likewise, the optical sensor 304 can be arranged within the receiving space 110 and proximate the free end 212, with no additional opening required.

Figure 3:
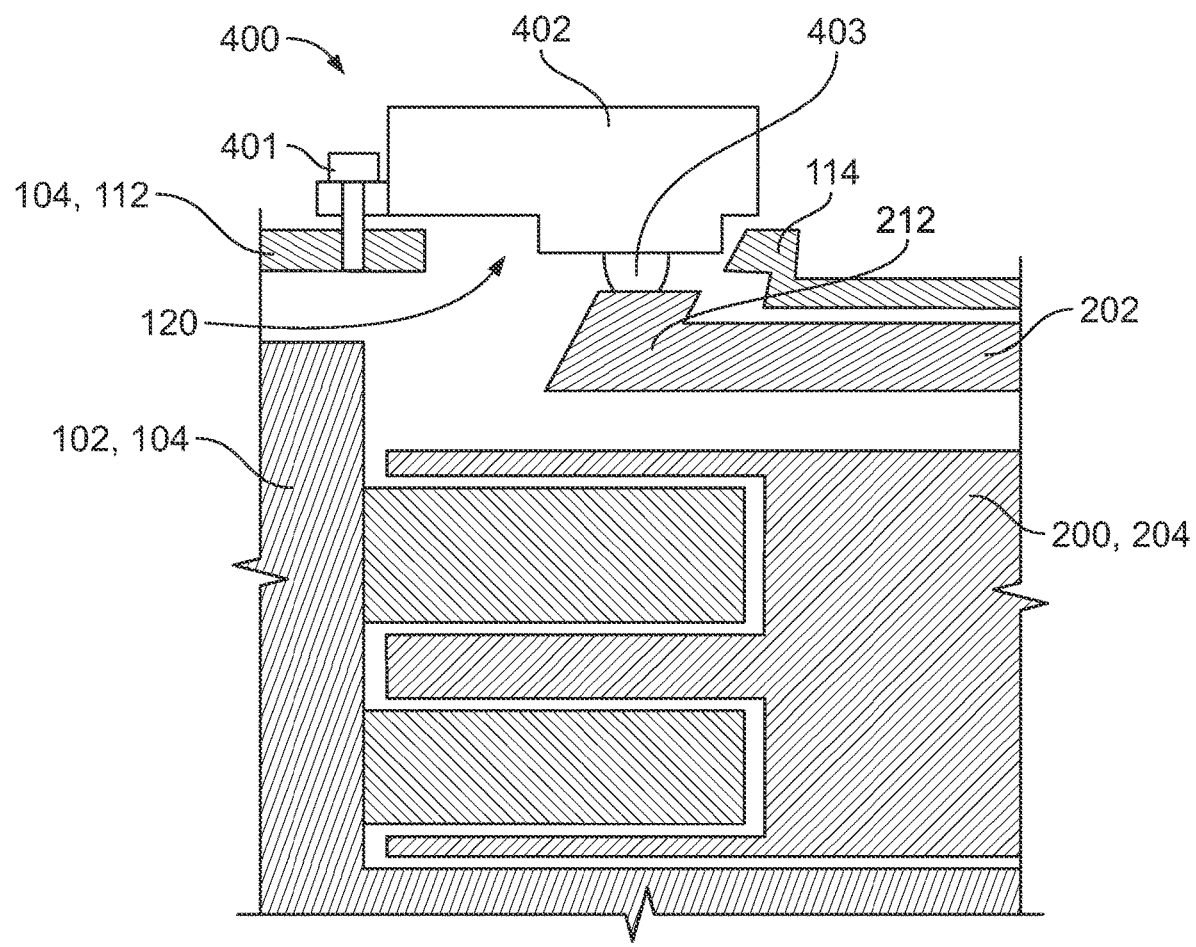
FIG. 3 is partial cross-sectional view of a charging inlet and charging plug having a plug position detection system according to an embodiment of the present disclosure.

Referring now to FIG. 3, embodiments of the present disclosure may include an electronics package 400 having a housing 402 fixedly attached to the inlet 102 via at least one fastener 401. The package 400 houses a mechanical button or switch, with a movable end 403 thereof extending through the housing 402. The moveable end 403 extends through the opening 120 in the wall 112 for contacting the free end 212 of the latch 202 only in the installed position of the plug 200. More specifically, the protruding free end 212 of the latch 202 engages with and depresses the moveable end 403 of the button or switch with the plug 200 in the installed position. The depression of the switch is operative to send a control signal to a system of the vehicle, by way of example, indicating a correctly installed charging plug, and/or a charging plug with a properly functioning latching or locking mechanism. The switch may take the form of a button (i.e., a spring-biased momentary button). Likewise, the switch may take the form of a button actuated by a cantilevered arm, thereby improving reliability by reducing friction (or potential interference) between the switch and the latch during insertion of the plug 200.

Figure 4:
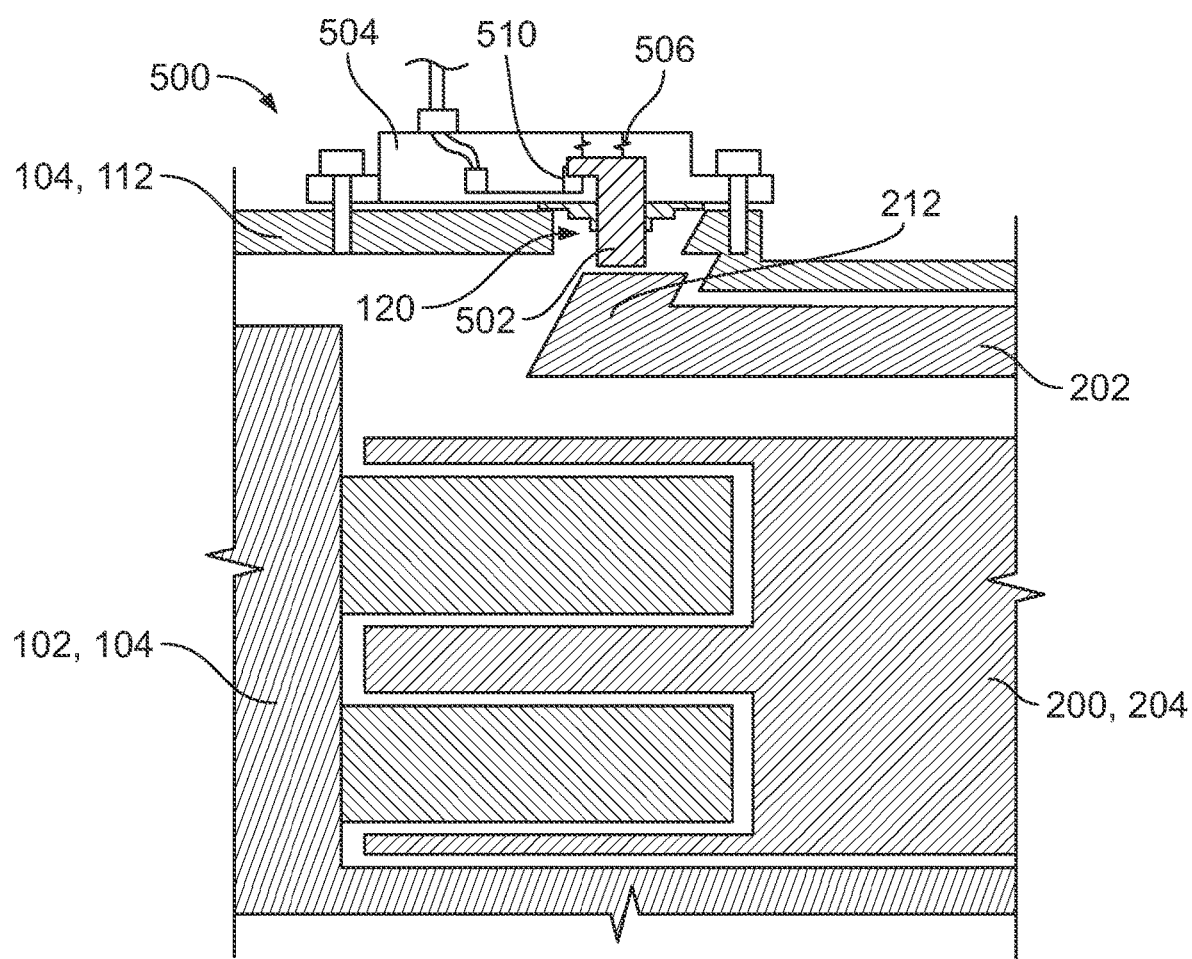
FIG. 4 is partial cross-sectional view of a charging inlet and charging plug having a plug position detection system according to an embodiment of the present disclosure.

FIG. 4 illustrates another embodiment of the present disclosure includes a sensing package 500 including moveably plunger 502 or button resiliently supported within a housing 504 and biased into an extending position through the opening 120 formed in the inlet housing wall. One or more springs 506 are utilized to bias the plunger 502 into an extended position, wherein electrical contact is made between the plunger, and a corresponding electrical contact 510 arranged within the housing 504. Electrical contact between the plunger 502 and the contact 510 may be broken by the presence of the latch 202 in the installed position, indicating to a system of the vehicle that the charging plug 200 has been correctly installed. Further, in each embodiment of the present disclosure, one or more seals may are provided between the switching packages or assemblies and any wires used to operatively connect to other systems. These seals are critical to ensure reliable and long-lasting operating of the system as the charging inlet 102 and its surroundings are exposed to harsh environmental conditions (moisture, debris, etc.)

Figure 5:
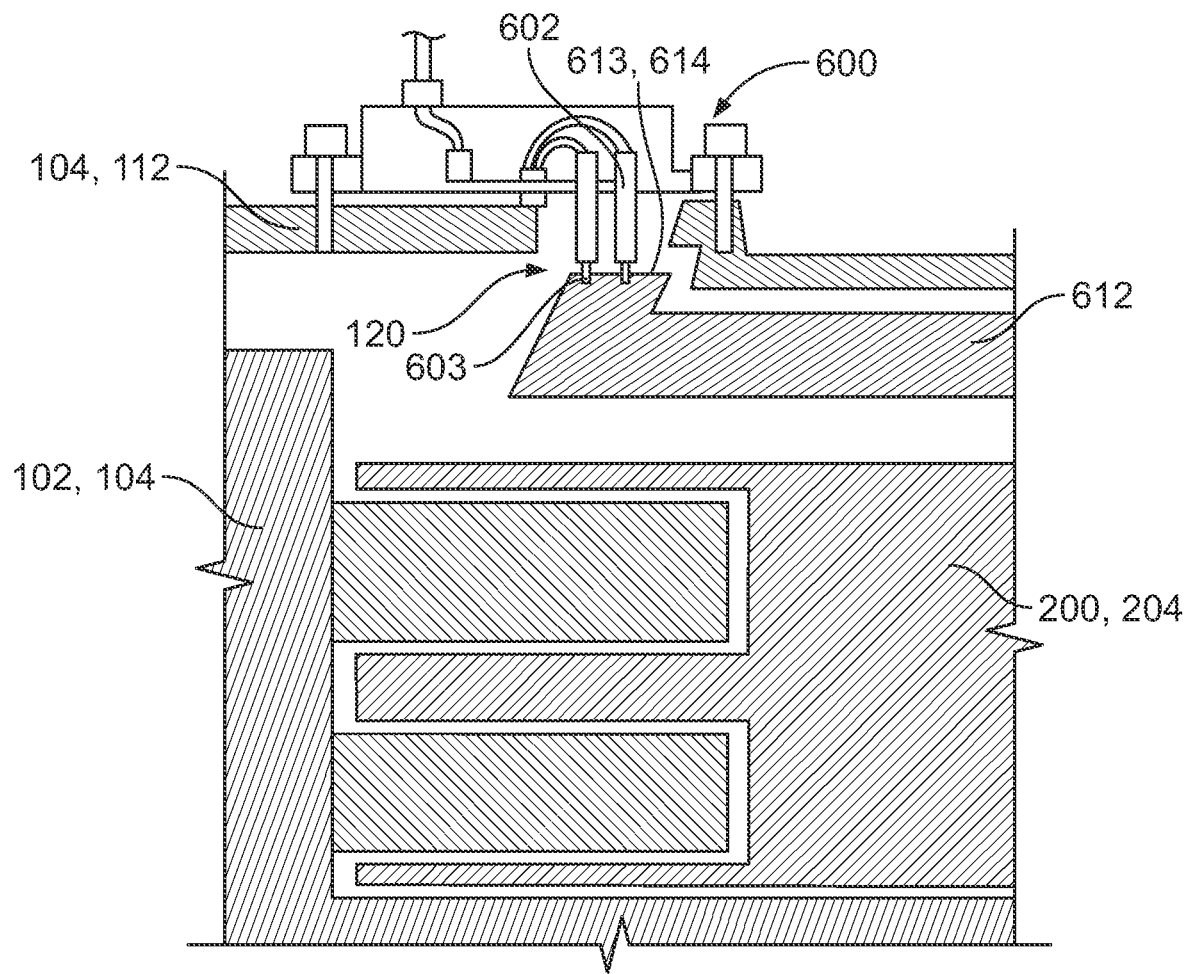
FIG. 5 is partial cross-sectional view of a charging inlet and charging plug having a plug position detection system according to an embodiment of the present disclosure.

With respect to FIG. 5, a sensor package 600 according to an embodiment of the present disclosure utilizes a latch 612 formed of a conductive material, or a latch having at least a layer of conductive material 613 over an end surface 614 thereof which engages with a switching assembly. As illustrated, the switching assembly may include two spring-loaded or "pogo" pins 602 having movable free ends 603 thereof extending through the opening 120 formed in the inlet housing wall 112. The free ends 603 of the pins 602 are adapted to engage with the conductive latch 612, or conductive surface 613 thereof, only in the installed position of the plug 200. In this way, a properly plug 200 will complete an electrical circuit between the pins 602, indicating a properly installed plug to a downstream control system. Likewise, an open circuit from either a partially or fully disconnected plug, or a fault in the latching mechanism, will be indicated to the system.

Figure 6:
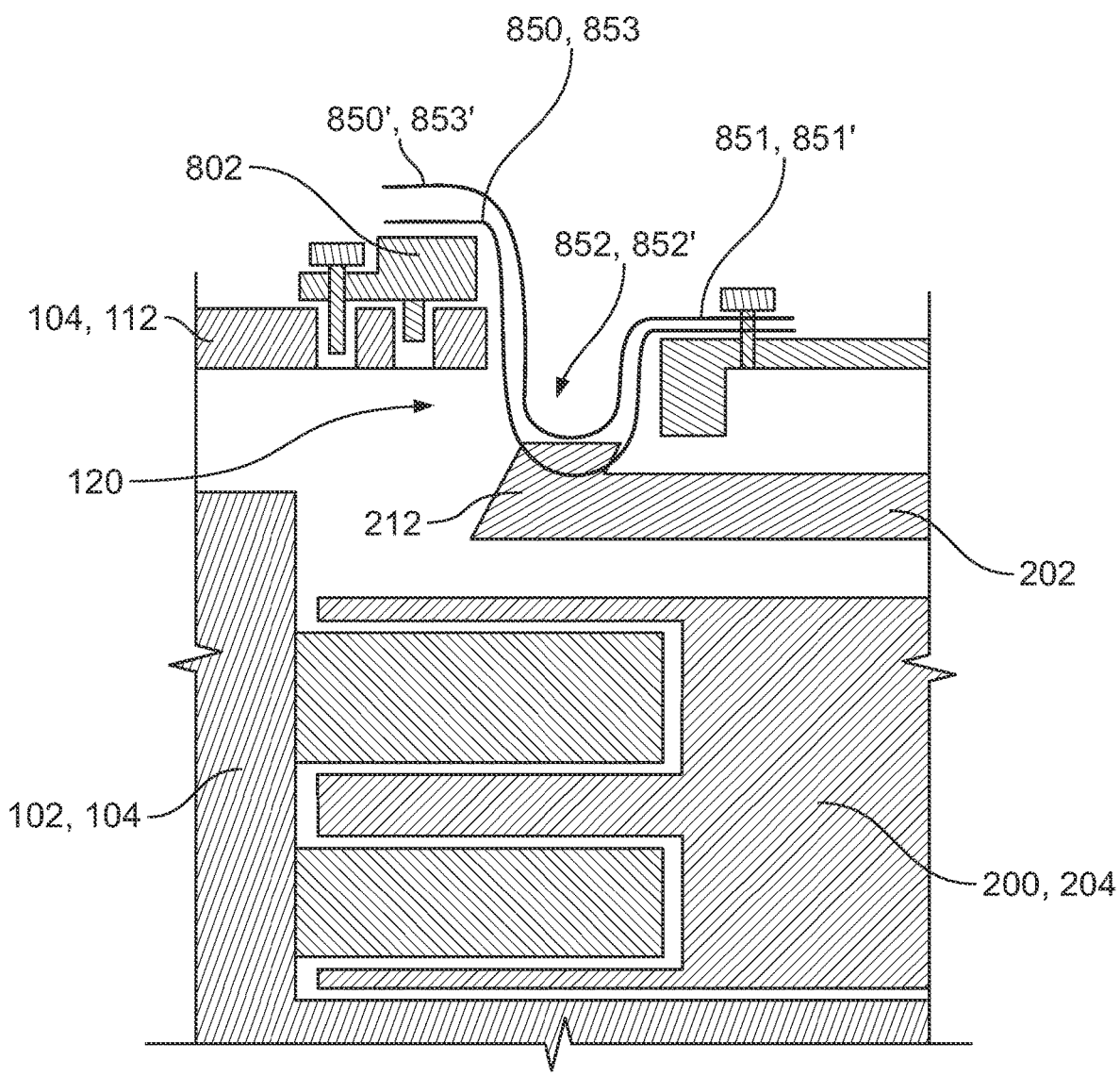
FIG. 6 is partial cross-sectional view of a charging inlet and charging plug having a plug position detection system according to an embodiment of the present disclosure.
Figure 7:
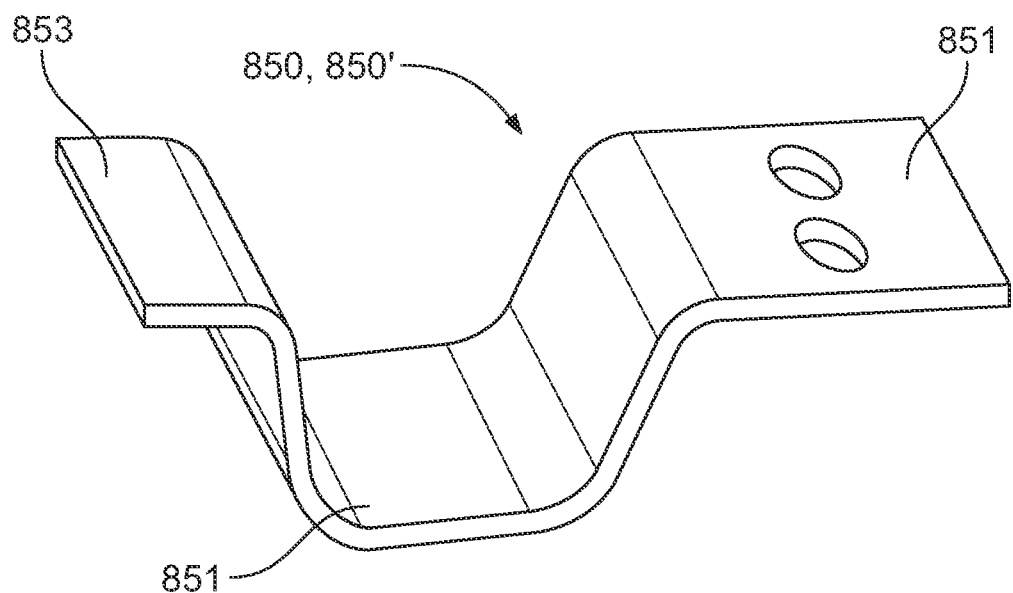
FIG. 7 is a perspective view of a metallic switching tab useful in plug position detection systems according to embodiments of the present disclosure.
Figure 8:
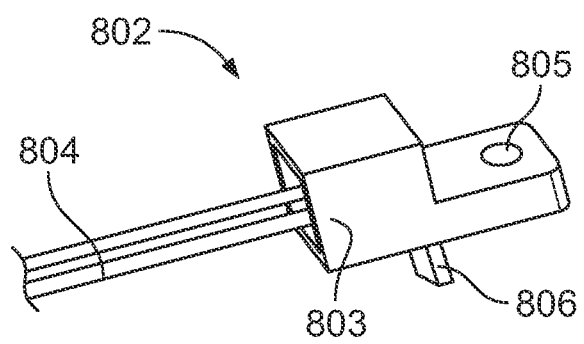
FIG. 8 is a perspective view of a sensor and associated housing useful in plug position detection systems according to embodiments of the present disclosure.

Referring now to FIG. 6-8, other embodiments of the present disclosure may include the use of a magnetic or Hall-effect sensor 802 to detect the presence (or absence) of an installed plug and/or latching mechanism thereof. As illustrated, a conductive (e.g., metal), flexible spring tab (850, first position; 850', second position) mounted on a first end 851 thereof to the inlet wall 112 via, for example, one or more fasteners. The tab 850 has a U-shaped central portion 852 which extends into the opening 120 formed in the inlet wall 112. A first position of the tab 850 is indicative of the latch 202 in an uninstalled position, wherein the free end 212 of the latch does not contact the U-shaped portion 852 of the tab. In this position, a free end 853 of the tab 850 may be in contact with, or located at a first distance from, the Hall-effect sensor 802 mounted to the inlet wall 112. However, with the plug 200 moved into the installed position, the protruding end 212 of the latch 202 extends at least partially upward and into the opening 120. As a result, the latch 202 contacts the U-shaped portion 852' of the tab 850' biasing it into a second shape or position. In the second position, the tab 850' is biased generally upwards, moving the free end 853' generally vertically and away from the sensor 802 to a second distance, greater than the first distance. This change in distance is detectable by the Hall effect sensor 802 and/or an associated control processor or system, indicating a properly installed and/or functioning charging plug and latch. In other embodiments, the tab 850 may be mounted to the plug latch 202, and biased by mechanical interaction with the inlet 102, without departing from the scope of the present disclosure.

As shown in FIGS. 6 and 8, the sensor 802 may include a body 803, lead wires 804, and a mounting hole 805. If mounted via only a single fastener to the inlet 102, the body 803 may also include an anti-rotation protrusion 806 extending from an underside thereof. A fastener inserted through the mounting hole 805 and the protrusion 806 extend through a pair of mounting holes in the inlet wall 112, as shown in FIG. 6. In this way, the sensor is preventing from rotating out of position due to, for example, vibration or other external forces acting thereon. Such a positioning feature 806 may also be utilized in each of the above embodiments, particularly those with sensors and/or switches held via only a single fastener.

With regard to any of the preceding embodiments, the position of the switches, sensors and other components may be altered from that shown in the exemplary embodiment without departing from the scope of the present disclosure.

Referring now to FIG. 9, a simplified schematic diagram of a system 900 according to embodiments of the present disclosure is shown. The system 900 may include a powered platform, such as an EV 902 having at least one control system 904 (e.g., a charging control system including one or more processors), a user interface 906, a battery 908, charging inlet 112 as described above, and a plug detection system 910. The system further includes a charging plug 920. As described above, embodiments of the present disclosure utilize the plug detection system 910 to convey a status of the charging plug 920 relative to the charging inlet 112 to, for example, the charging control system 904 of the vehicle. More particularly, the system 910 may detect the absence of a properly installed charging plug. The system 910 is further capable of detecting the (mere) depression of the locking mechanism by a user (e.g., the plug latch 210) prior to the physical disconnection of the plug from the inlet (or the corresponding terminals thereof from one another). In this way, the charging system 904 may cease charging operations of the battery 908 prior to mechanical/electrical disconnection, further increasing safety. Likewise, the system 910 enables the detection of a damaged latching mechanism, alerting both the control system 904 and a user (e.g., via the user interface or display 906) of a potential unsafe condition of a plug not secured within the inlet, despite a detected electrical connection.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A charging inlet for an electric vehicle, comprising:
   a housing defining a catch;
   a terminal arranged within the housing for engaging with a corresponding mating terminal of a charging plug; and
   a sensor connectable to a monitoring system of the electric vehicle for detecting the presence of a charging plug installed within the charging inlet, the sensor detecting the presence of a latch of the charging plug when the latch is engaged with the catch of the housing in an installed position of the charging plug relative to the housing.

2. The charging inlet of claim 1, wherein the sensor detects the presence of a charging plug independent of an electrical connection between the terminal and the mating terminal.

3. The charging inlet of claim 1, wherein the housing defines an opening formed therethrough proximate the catch, the sensor detecting the presence of the latch of the charging plug through the opening.

4. The charging inlet of claim 1, wherein the sensor is arranged within a sensor housing removably attached to the housing.

5. The charging inlet of claim 1, wherein the sensor includes an optical sensor.

6. The charging inlet of claim 1, wherein the sensor includes a magnetic sensor for detecting a change in a magnetic field associated with an installed position of the charging plug.

7. The charging inlet of claim 1, wherein the sensor includes a mechanical switch.

8. The charging inlet of claim 1, wherein the sensor includes a pair of conductive pins for electrically contacting a conductive surface of the charging plug in an installed position within the housing.

9. A charging system for an electric vehicle, comprising:
   a housing;
   at least one terminal arranged within the housing for engaging with a corresponding terminal of a charging plug;
   a monitoring system including at least one sensor for detecting the presence of the charging plug in an installed position within the housing, the at least one sensor detecting the presence of a latch of the charging plug or the housing when the latch is engaged with a catch of the other one of the charging plug or the housing.

10. The charging system of claim 9, wherein the sensor detects the presence of a charging plug independent of an electrical connection between the terminal and charging plug.

11. The charging system of claim 9, wherein the housing defines the catch for engaging the charging plug with the charging plug in the installed position relative to the housing, the sensor positioned to detect the presence of the charging plug engaged with the catch of the housing.

12. The charging system of claim 11, wherein the housing defines an opening formed therethrough proximate the catch, the sensor detecting the presence of the charging plug through the opening.

13. The charging system of claim 12, wherein the charging plug defines the latch and the sensor detects the presence of the latch of the charging plug when the latch is engaged with a catch of the housing.

14. The charging system of claim 13, wherein the monitoring system discontinues a charging operation upon a detection of the absence or depression of the latch.

15. The charging system of claim 9, wherein the sensor includes an optical sensor.

16. The charging system of claim 9, wherein the sensor includes a magnetic sensor for detecting a change in a magnetic field associated with the installed position of the charging plug.

17. The charging system of claim 9, wherein the sensor includes a mechanical switch.

18. A charging inlet for an electric vehicle, comprising:
   a housing;
   a terminal arranged within the housing for engaging with a corresponding mating terminal of a charging plug; and
   a sensor connectable to a monitoring system of the electric vehicle for detecting the presence of a charging plug installed within the charging inlet, the sensor arranged within a sensor housing removably attached to the housing of the charging inlet.

19. The charging inlet of claim 18, wherein the housing of the charging inlet defines one of a latch or a catch and the charging plug defines the other one of the latch or the catch, the sensor positioned and adapted to detect the presence of the latch engaged with the catch through an opening formed in the housing.

\* \* \* \* \*